Sheet 1. 2 Sheets.
6230X
W. Amesley.
Impt. in Construction of Vessels.
No. Patented Nov. 6, 1830
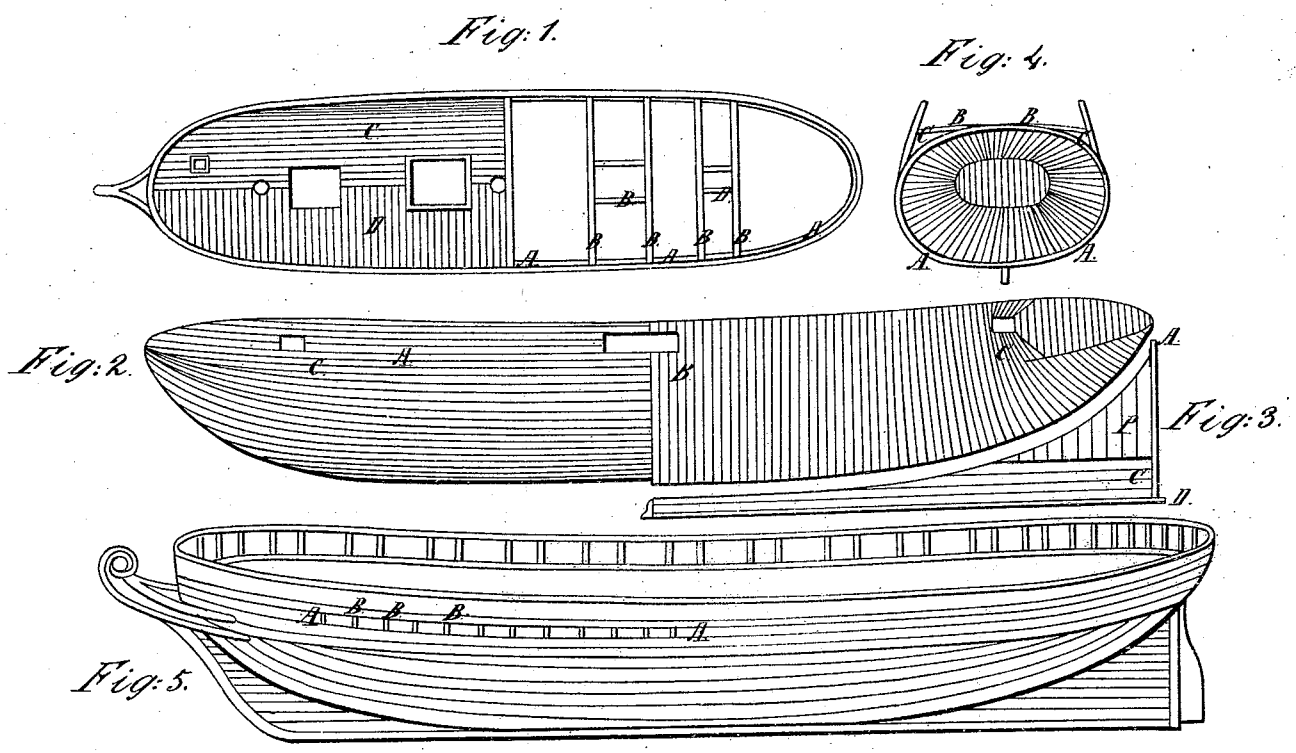
N. PETERS, PHOTO-LITHOGRAPHER, WASHINGTON, D. C.

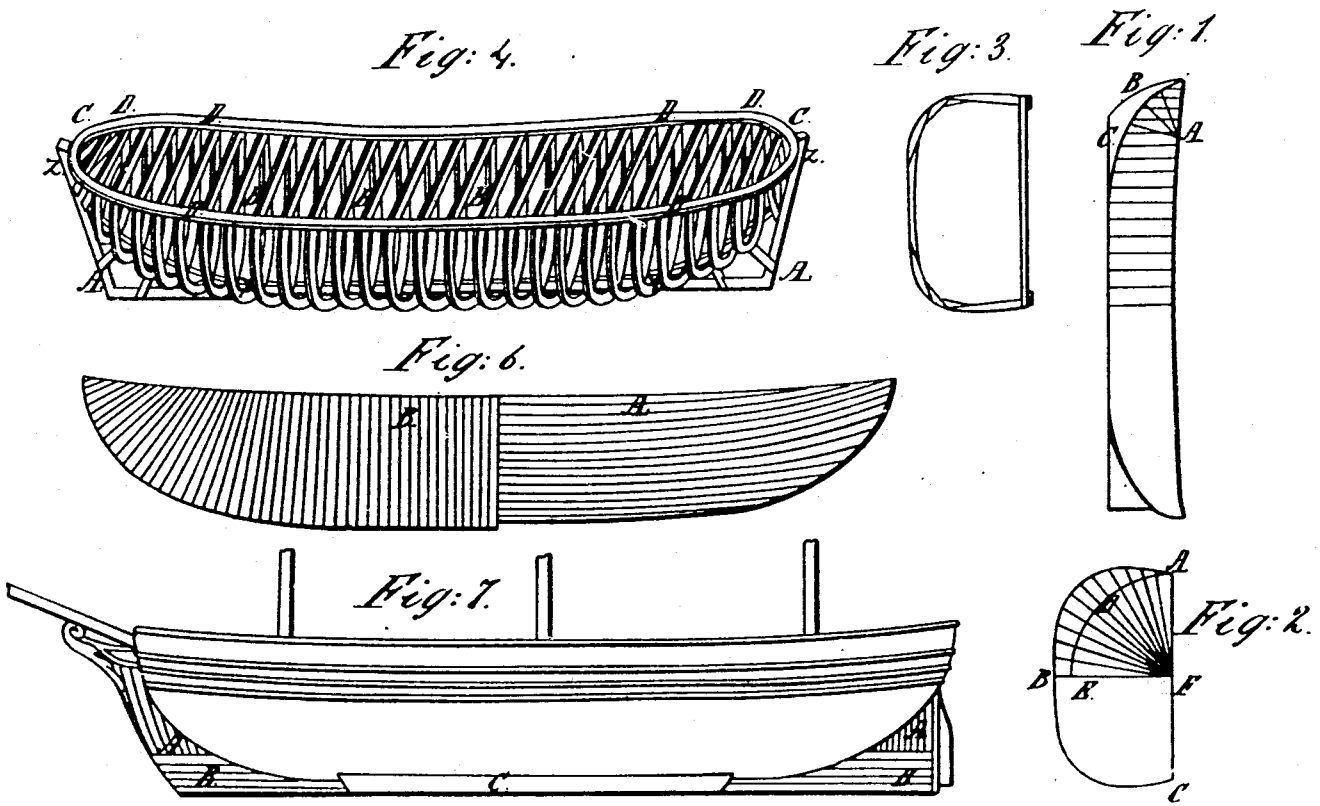

6230X
Sheet 2, 2 Sheets.
W. Amesley.
Impt. in Construction of Vessels.
No.
Patented Nov. 6, 1830.